United States Patent [19]

Parker et al.

[11] Patent Number: 5,194,884
[45] Date of Patent: Mar. 16, 1993

[54] IMAGE PROJECTION SYSTEM EMPLOYING A COLD CATHODE FIELD-EMISSION IMAGE SOURCE

[76] Inventors: Norman W. Parker, 1302 Scott St., Wheaton, Ill. 60187; Robert C. Kane, 15412 St. Patrick Rd., Woodstock, Ill. 60098

[21] Appl. No.: 819,752

[22] Filed: Jan. 13, 1992

Related U.S. Application Data

[63] Continuation-in-part of Ser. No. 682,504, Apr. 8, 1991, abandoned.

[51] Int. Cl.$^5$ .............................................. G03D 21/00
[52] U.S. Cl. ..................................... 353/122; 353/98; 358/231; 358/60
[58] Field of Search ................. 353/77, 98, 99, 122; 358/231, 230, 60; 313/309, 336

[56] References Cited

U.S. PATENT DOCUMENTS

| | | | |
|---|---|---|---|
| 4,178,531 | 12/1979 | Alig | 313/409 |
| 4,810,075 | 3/1989 | Fukuda | 353/77 |
| 4,941,036 | 7/1990 | Itoh | 358/231 |

OTHER PUBLICATIONS

Iror Brodie, "Advance Technology: Flat Cold Cathode CRT's", Information Display, Jan. 1989, pp. 17-19.

*Primary Examiner*—William A. Cuchlinski, Jr
*Assistant Examiner*—William C. Dowling
*Attorney, Agent, or Firm*—Eugene A. Parsons

[57] ABSTRACT

An image projection system utilizing a cold cathode field emission device to provide the image source is provided. By using a cold cathode field emission device as an image source, an improved image may be achieved as compared to that of a conventional electron-gun CRT image source. First, the resulting image provides improved resolution, due to the fact that smaller pixel cells may be achieved with the cold cathode device. Second, the resulting image is considerably brighter, due to the fact that much higher current densities are achievable with a cold cathode image unit, as compared to the older electron-gun CRT unit.

10 Claims, 2 Drawing Sheets

IMAGE PROJECTION SYSTEM EMPLOYING A COLD CATHODE FIELD-EMISSION IMAGE SOURCE

RELATED APPLICATION

This is a continuation-in-part of application Ser. No. 07/682,504 filed Apr. 8, 1991, now abandoned, which application is hereby incorporated by reference verbatim and with the same effect as though the same application were fully and completely set forth herein.

FIELD OF THE INVENTION

This application relates generally to cold cathode field emission devices and more particularly to image projection systems using cold cathode field emission devices.

BACKGROUND OF THE INVENTION

Cold cathode field emission devices are known. See, for example, U.S. Pat. No. 3,755,704, entitled "Field Emission Cathode Structures and Devices Utilizing Such Structures," issued Aug. 28, 1973 to Charles A. Spindt, et al.

It is also known to utilize such devices for display devices. See, for example, U.S. Pat. No. 178,531, entitled "CRT with Field-Emission Cathode," issued Dec. 11, 1979 to Roger C. Alig. See, also, "Field-Emitter Arrays Applied to Vacuum Fluorescent Display," Charles A. Splindt, et al., IEEE Transactions On Electron Devices, Vol, 36, No. 1, January 1989, pages 225–228.

As is known, such devices utilize the cold cathode device as a source of electrons that are emitted towards a corresponding anode that is coated with an appropriate luminescent material. As the electrons impact the luminescent material, they cause it to emit photons. The emitted photons are, in turn, detected by eye of a human viewer. Such a display device is the subject of U.S. patent application Ser. No. 414,836, filed Sep. 29, 1989, entitled "Flat Panel Display Using Field Emission Devices," by inventor Robert C. Kane, co-inventor of the present invention.

To date, the thrust of cold cathode field emission device technology in the area of display devices has focused on flat-screen displays. See, "Advanced technology: flat cold-cathode CRTs," Ivor Brodie, Information Display January, 1989, pages 17–19.

SUMMARY OF THE INVENTION

The inventors have discovered that cold cathode field emission devices may be utilized to provide the image source in projection television systems. Heretofore, such projection television systems have utilized conventional electron gun cathode ray tube ("CRT") units for an image source. The inventors have discovered that, by substituting a cold cathode field emission device for an image source, the resulting projected image is improved in at least two aspects, as follows:

First, improved resolution is achieved. This is due to the fact that smaller pixel cells may be achieved using the cold cathode technology as compared to the older electron gun CRTs.

Second, the resulting image is considerably brighter. This is related to the fact that current densities of $10^3$ Amperes per $cm^2$ may be achieved with typical cold cathode units, whereas current densities in the older electron-gun CRT units are typically limited to 10 Amperes per $cm^2$—an improvement of two orders of magnitude.

DETAILED DESCRIPTION

It is one object of the present invention to provide a projection display image source which functions in an addressable, non-scanned mode which is not possible with projection systems of the prior art CRT technology.

It is another object of the present invention to provide a projection display image source which is significantly reduced in volume relative to the prior art CRT technology.

It is yet another object of the present invention to provide a projection display system which employs a field emission image source as described herein to provide improved image resolution and brightness relative to the prior art CRT technology.

Figure 1:
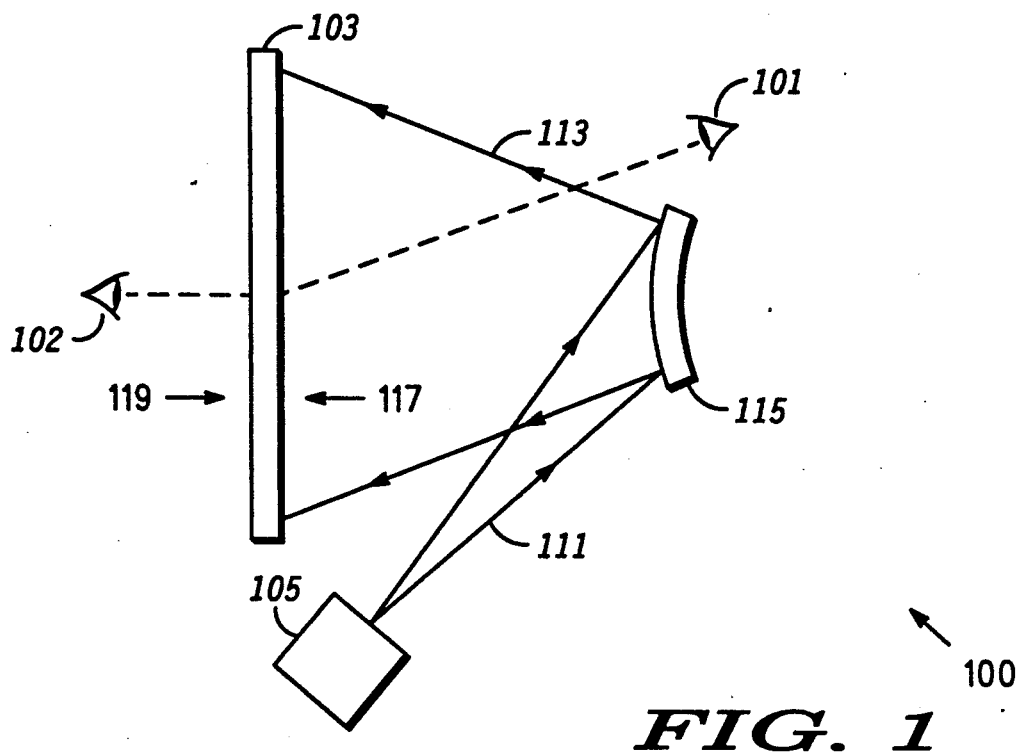
FIG. 1 shows a first embodiment 100 of an image projection system, according to the invention.

Referring now to FIG. 1, there is shown a first embodiment 100 of an image projection system, according to the invention. There is shown an image source using a cold cathode field emission device 105 arranged to project an image 111 towards a convex mirror 115. The convex mirror 115 is arranged to reflect the incoming image 111 and produce a reflected image 113. As shown, the reflected image 113 finally impacts a screen 103, thereby forming a visual image that may be viewed by the human eye.

As shown, the screen 103 has a front side 117 and a rear side 119. In a "front projection" mode, a first view 101 may view the image from screen 103's front side 117. In a "rear projection" mode, a second viewer 102 may view the image from the screen 103's rear side 119.

Figure 2:
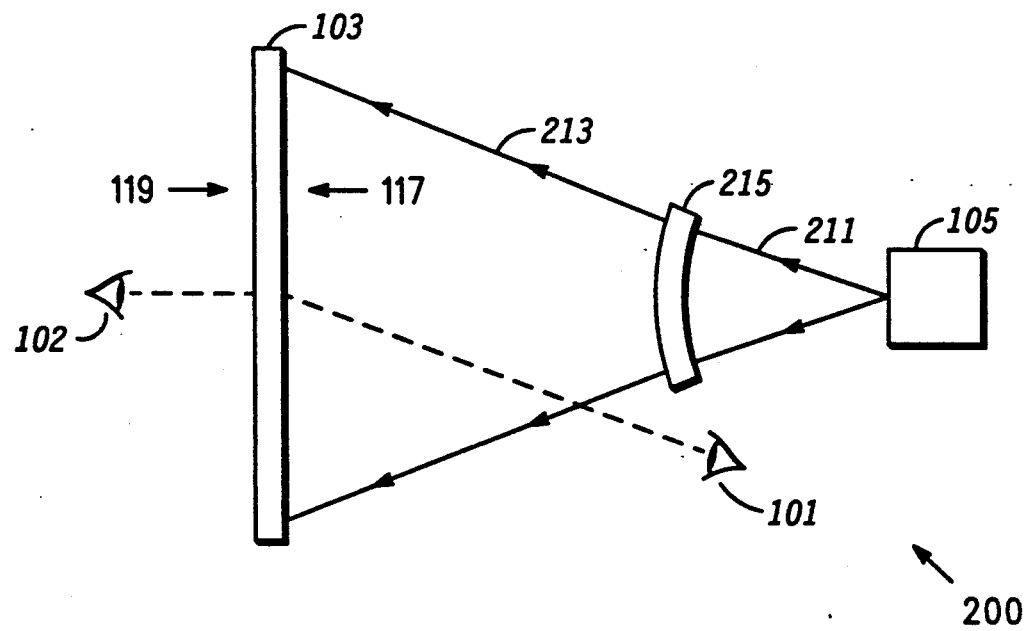
FIG. 2 shows a second embodiment 200 of an image projection system, according to the invention.

Referring now to FIG. 2, there is shown a second embodiment 200 of the invention. There is shown the image source 105 arranged to project an image 211 towards a lense 215. The lense 215 is arranged to refract the incoming image 211, thereby producing a refracted image 213. As shown, the refracted image 213 finally impacts the screen 103, thereby forming a visual image that may be viewed by the human eye.

In a "front projection" mode, a first view 101 may view the image from the front side 117 of screen 103. In a "rear projection" mode, a second view 102 may view the image from the rear side 119 of screen 103.

Figure 3A:
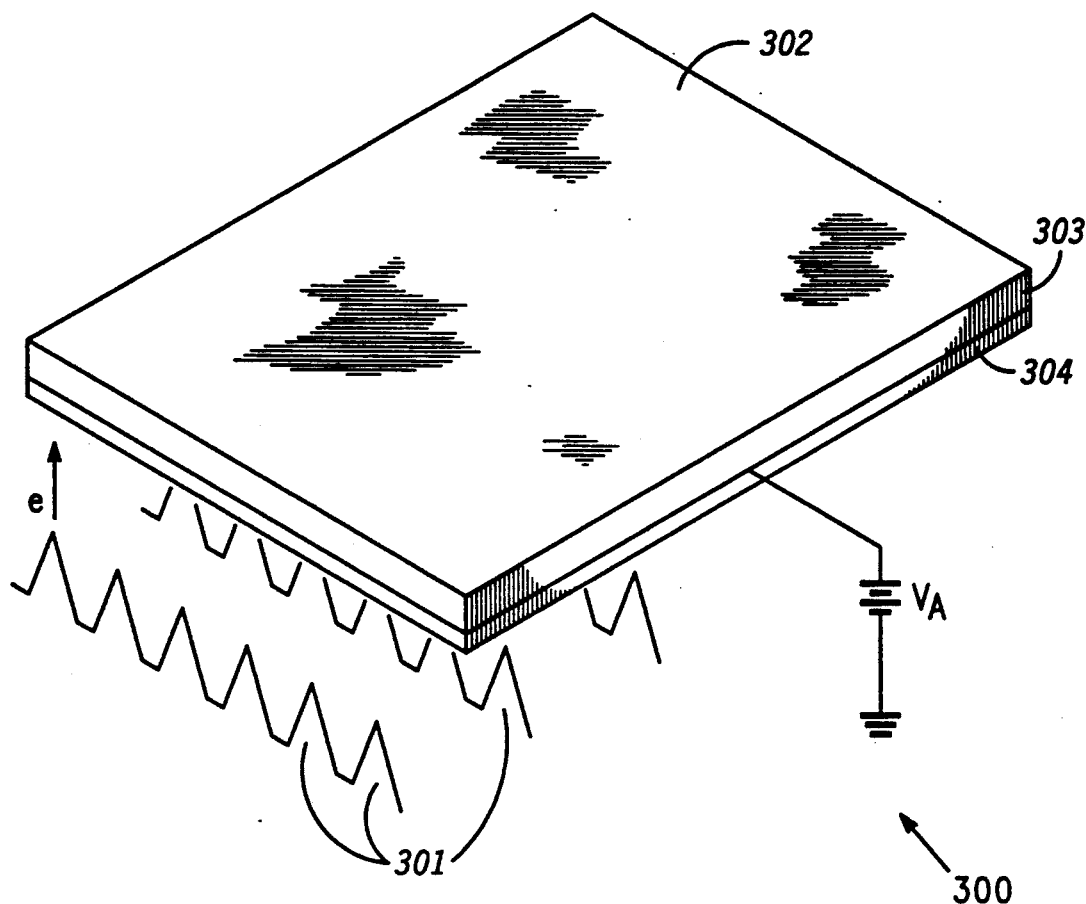
FIGS. 3A–3B depict one possible embodiment of a field emission source 300.

Furthermore, FIG. 3A depicts one possible embodiment of a field emission image source 300 wherein the field emission image source 300 is comprised of at least a plurality of electron emitters 301 each of which plurality may be selectively, preferentially energized by any of the known methods of operating field emission devices so as to provide emitted electrons designated "e" to substantially impinge on at most a selected part of an image source faceplate 302. This excitation method provides for individual addressing of image source picture elements (pixels). The image source faceplate 302, distally disposed with respect to the at least plurality of electron emitters may be comprised of at least a first faceplate layer 303 on which is disposed at least a first layer of cathodoluminescent material 304, for emitting photons such that the at least first layer of cathodoluminescent material 304 is imposed in the intervening region between the at least first faceplate layer 303 and that at least plurality of electron emitters 301.

Field emission image sources of the prior art may not be employed as projection display/projection television image sources due to the brightness restrictions imposed by methods utilized to realize the prior art devices. The prior art teaches that the interelectrode spacing between the faceplate and the electron emitters is desirably very small for a number of reasons including reduced electron scattering and the desirability to use the substrate surface disposed nearest to the faceplate as a reflective surface. Additionally, field emission display image sources of the prior art employ spacers to provide that the faceplate is not distorted due to the internal vacuum of the structure. As such, a practical limit is placed on the maximum interelectrode spacing of a few hundred microns and voltage which may be applied to the device anode which is on the order of a few hundreds of volts.

In order that a cathodoluminescent image source be usable as an image source for a projection display system, it is a requirement that maximum luminous output be obtained from the cathodoluminescent material employed to emit photons. For commercially available cathodoluminescent phosphors the maximum obtainable luminous output is obtained with anode voltages on the order of 10,000 to more than 40,000 volts. By providing a field emission device image source of the present invention with an interelectrode spacing on the order of from 2 millimeters to more than 10 millimeters, it is possible to effect device operation with an applied anode potential on the order of 10,000 volts or more. The field emission device image source of the present invention, when operated with an anode potential of 10,000 volts or more, provides for efficient excitation of the cathodoluminescent phosphor to the extent that the luminous output is satisfactory for use as a projection television/projection display image source. FIG. 3A further depicts a voltage source $V_A$, operably coupled to the faceplate 302. For the field emission device image source now under consideration, it is preferred that the voltage source provide a voltage to the faceplate of at least 10,000 volts to as much as 40,000 volts.

Figure 3B:
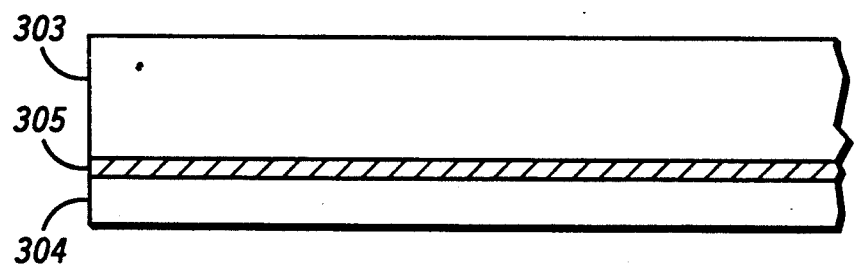

In FIG. 3B a device anode 305, for collecting at least some of any emitted electrons which impinge on the at least first layer of cathodoluminescent material 304, may be realized as a layer of substantially optically transparent conductive material deposited onto the at least first faceplate layer 303 prior to deposition of the at least first layer of cathodoluminescent material 304 in which instance the at least first layer of cathodoluminescent material 304 will be disposed on the substantially optically transparent conductive film. Alternatively, the device anode 305 may be realized as a deposition of a conductive layer directly onto the at least first layer of cathodoluminescent material 304.

A field emission image source employing at least a plurality of selectively activated/energized electron emitters each to selectively energize at most a part of an image source faceplate is preferentially operated in a non-scanned mode. Provision of a non-scanned image source, to be utilized as an integral part of a projection display system, provides a means of enhanced system performance and reduction in image source size. By operating the field emission image source in a non-scanned/continuous mode the commonly known saturation effects which are exhibited in cathodoluminescent materials are not encountered. As such it is possible, by utilizing the field emission image source of the present invention, to realize significant improvement in system image brightness. Alternatively, operating the image source of the present invention in a line-by-line switched mode provides at least some improvement over the prior art CRT technology.

While various embodiments of an image projection system, according to the present invention, have been described hereinabove, the scope of the invention is defined by the following claims.

What is claimed is:

1. An image projection system comprising:
    source means for providing an image, said source means including a cold cathode field emission device that sources a non-scanning stream of electrons,
    a plurality of electron emitters for emitting electrons,
    a faceplate on which is disposed a layer of cathodoluminescent material distally disposed with respect to the electron emitters by an interelectrode spacing of at least 2 millimeters,
    a voltage source operable coupled to the faceplate and providing a voltage of at least 10,000 volts,
    projection means for projecting said image on a display device.

2. The image projection system of claim 1 wherein said projection means includes a mirror.

3. The image projection system of claim 2 wherein said display device includes a viewing screen.

4. The image projection system of claim 3, said viewing screen including a front side, the front side facing said mirror, said image projection system arranged for viewing from said front side.

5. The image projection system of claim 3, said viewing screen including a rear side, the rear side facing away from said mirror, said image projection system arranged for viewing from said rear side.

6. The image projection system of claim 1 wherein said projection means includes a lense.

7. The image projection system of claim 6 wherein said display device includes a viewing screen.

8. The image projection system of claim 7, said viewing screen including a front side, the front side facing said mirror, said image projection system arranged for viewing from said front side.

9. The image projection system of claim 7, said viewing screen including a rear side, the rear side facing away from said mirror, said image projection system arranged for viewing from said rear side.

10. The image projection system of claim 1 wherein each of the plurality of electron emitters may be selectively energized so as to provide emitted electrons to impinge on a selected part of the faceplate.

* * * * *